(12) United States Patent
Song et al.

(10) Patent No.: US 8,092,340 B2
(45) Date of Patent: Jan. 10, 2012

(54) HYBRID ELECTRIC VEHICLE POWERTRAIN CONTROL AFTER A REQUESTED CHANGE IN VEHICLE DIRECTION

(75) Inventors: Jing Song, Novi, MI (US); Deepa Ramaswamy, Canton, MI (US); Anthony D. Tsakiris, Beverly Hills, MI (US); Ihab S. Soliman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 445 days.

(21) Appl. No.: 12/500,632

(22) Filed: Jul. 10, 2009

(65) Prior Publication Data

US 2011/0009235 A1   Jan. 13, 2011

(51) Int. Cl.
*B60W 10/08* (2006.01)
*B60W 10/10* (2006.01)
(52) U.S. Cl. .............. 477/5; 477/6; 477/15; 477/18; 477/20

(58) Field of Classification Search ............... 477/3, 5, 477/6, 15, 18, 20
See application file for complete search history.

(56) References Cited

U.S. PATENT DOCUMENTS

| 6,881,167 | B2 * | 4/2005 | Inada ............... 475/5 |
| 7,102,313 | B2 * | 9/2006 | Kadota et al. ......... 318/465 |
| 7,383,115 | B2 * | 6/2008 | Tabata et al. ......... 701/96 |
| 7,670,257 | B2 * | 3/2010 | Popp et al. .......... 477/6 |
| 2001/0003109 | A1 * | 6/2001 | Tabata ............. 477/5 |

* cited by examiner

*Primary Examiner* — Ha D. Ho
(74) *Attorney, Agent, or Firm* — David B. Kelley; MacMillan, Sobanski & Todd, LLC

(57) ABSTRACT

A method for controlling a hybrid electric vehicle powertrain includes operating an engine driveably connected to first vehicle wheels, providing an electric motor driveably connected to second vehicle wheels, shifting a gear selector between a forward drive position and a reverse drive position, reducing vehicle speed to or lower than a reference speed, and using a transmission located between the engine and the first wheels and the electric motor to produce reverse or forward drive corresponding to the position to which the gear selector is shifted.

20 Claims, 2 Drawing Sheets

HYBRID ELECTRIC VEHICLE POWERTRAIN CONTROL AFTER A REQUESTED CHANGE IN VEHICLE DIRECTION

BACKGROUND OF THE INVENTION

1. Field of the Invention

This invention relates generally to a powertrain for a hybrid electric vehicle (HEV), and more particularly, to controlling the actuators of a HEV when the driver requests a change from a forward to a reverse vehicle motion direction or from reverse to forward vehicle motion direction.

2. Description of the Prior Art

As illustrated in the FIG. 1, a HEV powertrain may be arranged with a first and second vehicle propulsion torque path. The first path may include an engine connected to an electric machine, such as a crank integrated starter-generator (CISG), and a multiple-speed, discrete ratio transmission connected to the electric machine, the first torque path being driveably connected to a first set of vehicle wheels. The second torque path includes an electric motor driveably connected to a second set of vehicle wheels, producing an electric rear axle drive (ERAD).

The transmission may be a powershift transmission having dual input clutches and dual layshaft gear sets or an automatic transmission having planetary gear sets with a hydrokinetic torque converter and control elements for producing forward drive in multiple gear ratios and reverse drive.

When a vehicle operator shifts a gear lever selector (i.e. PRNDL) between a forward drive position and a reverse drive position, or vice versa, the operator expects that the vehicle will slow down, stop, and then move in a direction opposite to the current direction of motion. To achieve this, in conventional vehicles, the transmission gear is disengaged from a forward gear and engaged into a reverse gear (or vice versa) if the vehicle speed is sufficiently low. But in a HEV powertrain which provides dual vehicle propulsion torque paths and is equipped with multiple torque actuators (i.e. engine, electric machines) and an automatic transmission, care has to be taken in switching from a forward to a reverse vehicle direction (or vice versa) in order to prevent unintended vehicle motion, engine stall, driveline disturbances, and potential damage to the powertrain actuators.

A need exists in the industry for a powertrain control system technique that avoids these potential problems and provides the driver's expected vehicle function.

SUMMARY OF THE INVENTION

A method for controlling a hybrid electric vehicle powertrain includes operating an engine driveably connected to first vehicle wheels, operating an electric motor driveably connected to second vehicle wheels, shifting a gear lever selector between a forward drive position and a reverse drive position, reducing vehicle speed to or lower than a reference speed, and using a transmission located between the engine and the first wheels to produce reverse or forward drive corresponding to the position to which the gear lever selector is shifted.

The control method also uses the electric motor driveably connected to the second wheels and the transmission in order to change the vehicle motion direction in response to a change-of-mind shift of the gear lever selector, such as a forward to reverse (i.e. D-R) shift followed by a reverse to forward (i.e. R-D) shift, or the inverse of that shift.

The control produces an appropriate change in gear range consistent with the driver's manual control of the gear lever selector. The control further prevents damage to the transmission, engine and electric motor, provides smooth gear engagement, and potentially alerts the driver to an inappropriate gear selection.

The scope of applicability of the preferred embodiment will become apparent from the following detailed description, claims and drawings. It should be understood that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
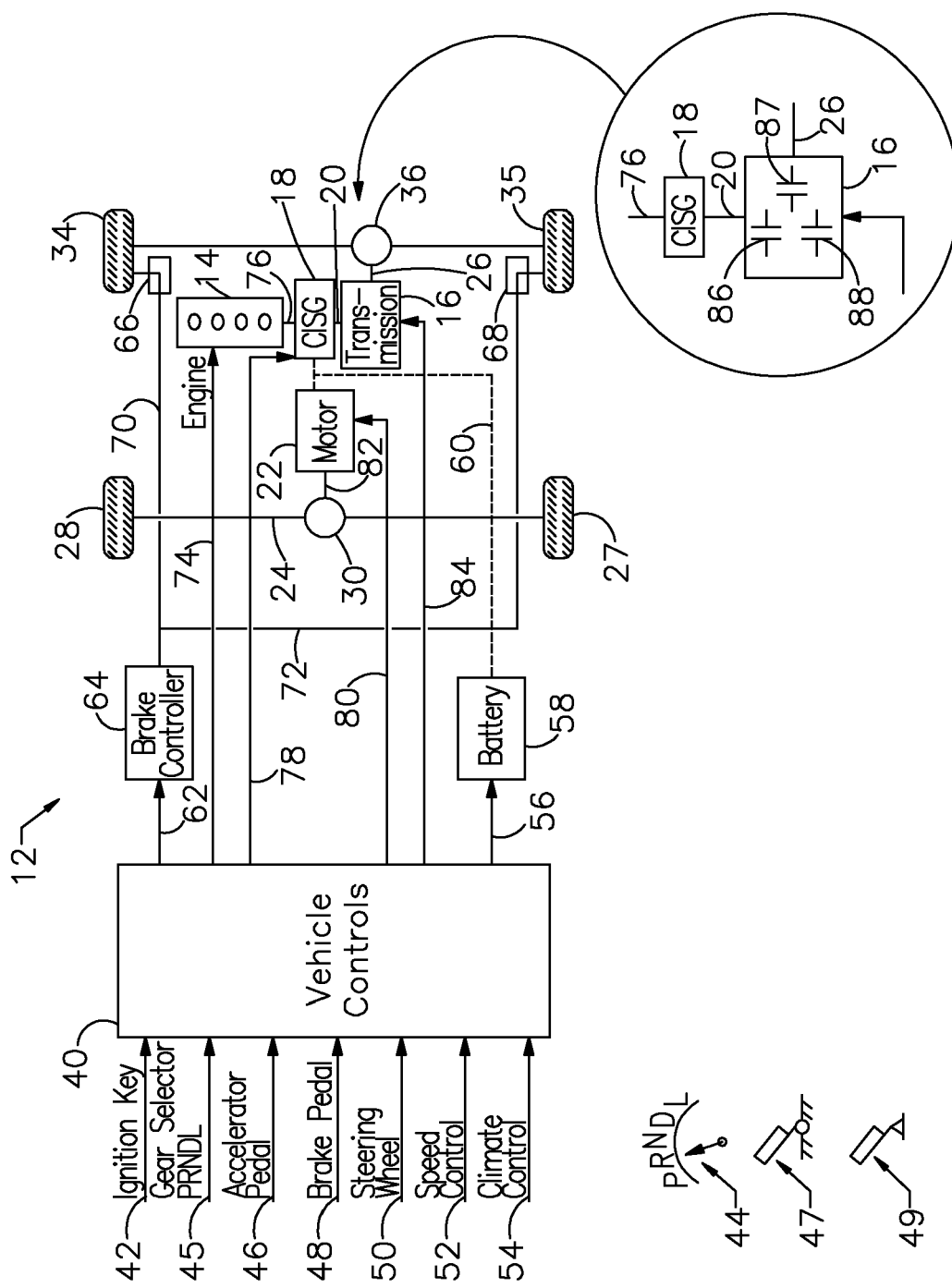
FIG. 1 is a schematic diagram of a schematic powertrain for a HEV.

As shown in FIG. 1, a vehicle powertrain and control system 12 includes an engine 14, such as a diesel or gasoline engine; a transmission 16, such as dual clutch powershift transmission or another multiple speed transmission; an electric machine 18, such as a crank-integrated starter generator (CISG) driveably connected to the transmission input 20; and an additional electric machine 22, such as an electric motor. Electric machine 18 provides starter/generator capability.

Electric machine 22, sometimes referred to as an electric rear axle drive unit (ERAD), is connected to the final drive of a rear axle 24 and provides additional propulsion capability in either an electric drive or hybrid (series/parallel) drive mode. In front-wheel drive (FWD) applications, electric machine 22 could also be connected to the final drive of a front axle at the output 26 of the transmission, and would be referred to as an electric front axle drive (EFAD) unit. Power output by the electric machine 22 drives vehicle wheels 28, 27 through ERAD gearing (not shown) and a final drive unit 30, which is in the form of an inter-wheel differential mechanism. Similarly, the transmission output 26 is driveably (mechanically) connected to vehicle wheels 34, 35 through a final drive unit 36, which includes an inter-wheel differential mechanism.

Powertrain 12 can operate in major modes including: (1) series hybrid drive, in which engine 14 is running and producing combustion, transmission 16 is disengaged, CISG 18 is generating electric power, and ERAD 22 is alternately motoring and driving the vehicle wheels 28,27; (2) engine drive, in which CISG 18 and ERAD 22 are both inoperative and engine 14 is running with transmission 16 engaged in gear, as in a conventional powertrain; (3) parallel hybrid drive, in which engine 14 is running, transmission 16 is engaged in gear, CISG 18 and/or ERAD 22 are operative; (4) engine starting, in which CISG 18 is motoring to start the engine by driving the engine flywheel; and (5) engine stop, in which engine 14 is shut down. While operating in parallel hybrid drive mode, the powertrain can operate in several sub-modes including: (3.1) parallel hybrid drive 1, in which CISG 18 is shutdown, ERAD 22 is motoring and generating; (3.2) parallel hybrid drive 2, in which CISG 18 is motoring and ERAD 22 is shutdown; (3.3) parallel hybrid drive 3, in which CISG 18 and ERAD 22 are motoring; and (3.4) parallel hybrid drive 4, in which CISG 18 is generating and ERAD 22 is alternatively shutdown, motoring and generating.

A vehicle controller 40 receives signals 42 representing the start or stopped status of an engine ignition key, signals 45 representing the manually selected position of a PRNDL gear lever selector 44, signals 46 representing the magnitude of displacement from a reference position of an accelerator pedal 47, signals 48 representing the magnitude of displacement from a reference position of a brake pedal 49, signals 50 representing the angular displacement from a reference position of a steering wheel, signals 52 representing a desired vehicle speed selected through a vehicle speed control system, and signals 54 representing a selected air temperature and supply vent through which air is supplied to a passenger compartment through a climate control system.

Controller 40 issues contactor open and close commands 56 for connecting an electric storage battery 58 to a high voltage bus 60. Electric storage battery 58 is electrically connected to motor 22 and the starter generator 18 through the high voltage bus 60.

Controller 40 issues wheel brake torque commands 62 to a brake controller 64, which actuates the wheel brakes 66, 68 with hydraulic brake pressure carried in lines 70, 72 to wheels 34, 35 to produce the commanded wheel brake torque represented by command signal 62. The brakes, however, may be electrically actuated rather than hydraulically actuated.

Controller 40 issues engine torque commands 74 to engine 14, in response to which engine 14 produces on its crankshaft 76 the desired engine output torque represented by commands 74.

Controller 40 issues generator torque commands 78, in response to which CISG 18 produces the desired torque at the transmission input 20 represented by commands 78.

Controller 40 issues motor torque commands 80, in response to which motor 22 produces the desired motor torque on its shaft 82. Controller 40 issues transmission gear commands 84, in response to which transmission 16 produces the gear ratio of the desired gear represented by commands 84.

In a conventional multiple-speed automatic transmission 16, forward gears and reverse drive are produced in accordance with engaged and disengaged states of friction control elements 86, 87, 88 enclosed in the transmission. The control elements 86, 87, 88, which are clutches and brakes that alternately hold, interconnect and release components of planetary or layshaft gear sets, become engaged in response to hydraulic pressure and are released when pressure at the respective control element is vented. The states of the control elements combine to produce the forward and reverse gears produced by transmission 16.

Figure 2:
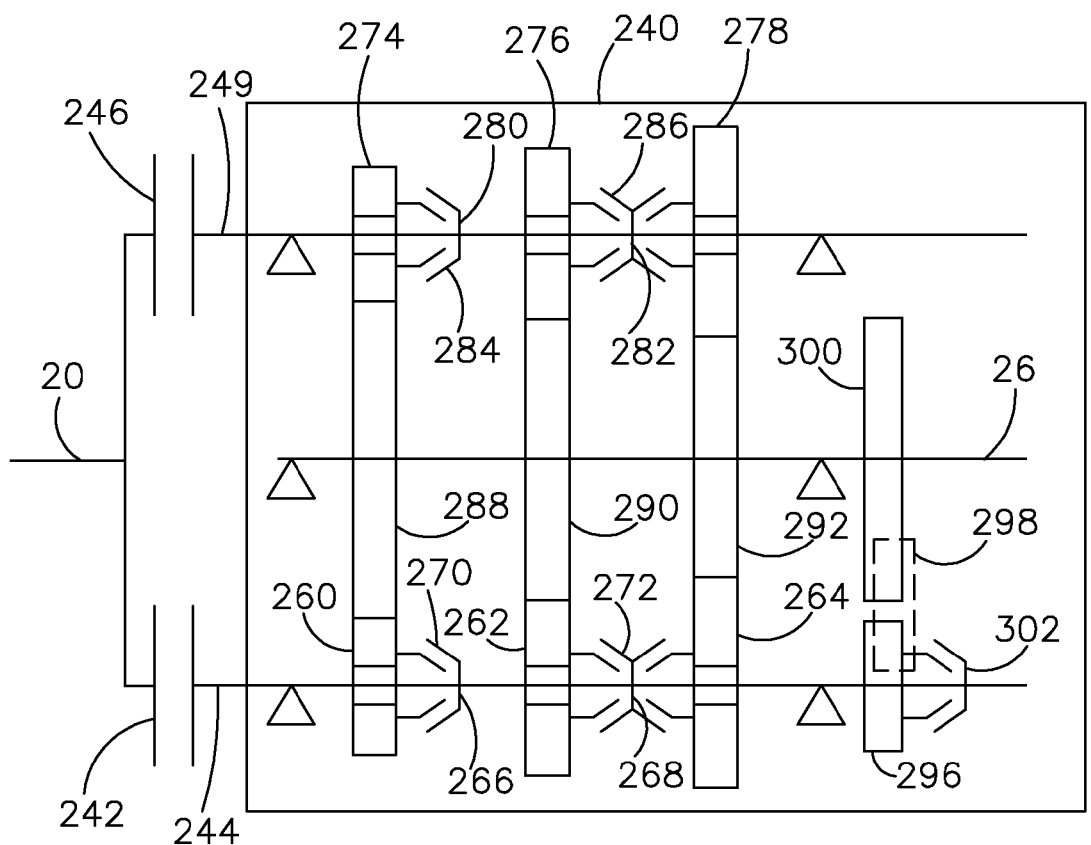
FIG. 2 is a schematic diagram showing details of a dual input clutch powershift transmission.

FIG. 2 illustrates details of a dual input clutch, powershift transmission 240, which includes a first input clutch 242 for selectively connecting the input 20 of the transmission alternately to the even-numbered forward gears and reverse gear associated with a first layshaft 244, and a second input clutch 246, for alternately connecting the input 20 to the odd-numbered gears associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 26 supports gears 288, 290, 292, which are each secured to output shaft 26. Gear 288 meshes with pinions 260 and 274. Gear 290 meshes with pinions 262 and 276. Gear 292 meshes with pinions 264 and 278.

A reverse pinion 296, journalled on layshaft 244, meshes with an idler 298, which meshes with a reverse gear 300 secured to output shaft 26. A coupler 302 selectively connects reverse pinion 296 to layshaft 244.

Couplers 266, 268, 280, 282 and 302 may be synchronizers, or dog clutches or a combination of these.

The dual input clutch powershift automatic transmission 240 is prepared to produce the forward and reverse drive when the couplers connect the pinion associated with the desired gear to the appropriate layshaft 244, 249.

The control elements are the input clutches 242, 246, whose engaged, disengaged and slipping states alternately connect and release input 20 and the respective layshafts 244, 249.

The method used by system 12 controls the four actuating subsystems, i.e., engine 14, CISG 18, transmission 16 and electric drive motor 22, in various powertrain operating modes when the PRNDL gear lever selector 44 is shifted from drive to reverse or reverse to drive.

Figure 3:
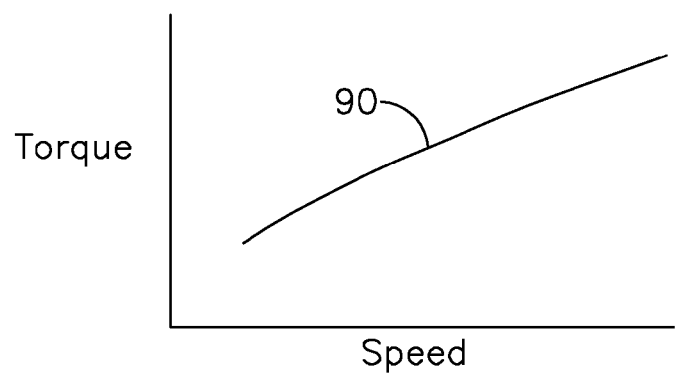
FIG. 3 is exemplary graph showing a function relating torque and vehicle speed.

In the electric drive operating mode during which motor 22 alone transmits power to the driven wheels 26, 27 and the driver shifts PRNDL gear selector 44 from drive to reverse or vice versa, engine 14 remains off, CISG 18 produces no output torque, transmission 16 is fully disengaged such that it transmits no torque to output 26, and either:

(i) motor 22 produces zero torque until the vehicle speed decreases to a reference vehicle speed, whereupon motor 22 produces output torque in axle 24 corresponding to the selected direction to which the gear lever selector 44 has been shifted; or (ii) motor 22 produces output torque in a direction corresponding to the selected direction to which the gear lever selector 44 has been shifted and at a magnitude defined by a torque-speed function 90, such as that shown in FIG. 3.

In the operating mode during which engine 14 alone produces power transmitted to the first wheels 34, 35, and the driver shifts PRNDL gear selector 44 from drive to reverse or vice versa, motor 22 produces no output torque, and either:

(i) transmission 16 is fully disengaged, i.e., transmits no torque to output 26, until vehicle speed decreases to a reference speed, whereupon the transmission is fully engaged in a gear that corresponds to the reverse or forward selected direction to which the gear selector 44 has been shifted; or (ii) slip is produced across control elements 86, 87, 88 of transmission 16 or control elements 246, 242 of transmission 240 in the forward gear or reverse gear that corresponds to the selected position of the gear selector 44, until vehicle speed decreases to a reference speed, whereupon the selected gear becomes fully engaged.

In the series hybrid drive operating mode, in which engine 14 is running and producing combustion, CISG 18 is generating electric power, motor 22 is motoring, i.e., driving axle 24, and the driver shifts PRNDL gear selector 44 from drive to reverse or vice versa, engine 14 remains running, and vehicle speed is reduced to a reference speed by either:

(i) simulating engine braking by operating motor 22 in a generating mode producing torque in the reverse direction or forward drive direction in opposition to the rotational direction of wheels 28, 27, and operate CISG 18 as a motor to rotate the engine in order to dissipate excess electric energy generated by motor 22, which cannot be stored in the battery 58; or (ii) producing no output torque from motor 22; or (iii) producing output torque from motor 22 in a direction corresponding to the selected direction to which the gear selector 44 has been shifted and at a magnitude defined by a torque-speed function 90.

When vehicle speed has decreased to the reference speed, transmission 16 is fully engaged in the forward gear or reverse gear that corresponds to the reverse or forward selected direction to which the gear selector 44 has been shifted.

In the parallel hybrid drive operating mode with engine 14 running, CISG 18 and ERAD 22 operative, when the driver shifts the PRNDL gear selector 44 from drive to reverse or vice versa, either:

(i) disengage transmission 16 and produce zero output torque from motor 22 until vehicle speed decreases to a reference speed, then fully engage transmission 16 in the forward gear or reverse gear that corresponds to reverse or forward selected drive to which the gear selector 44 has been shifted; or (ii) disengage transmission 16 and operate motor 22 to produce output torque at wheels 28, 27 in a direction corresponding to the selected direction to which the gear selector 44 has been shifted and at a magnitude defined by a torque-speed function 90 until vehicle speed decreases to a reference speed, then fully engage transmission 16 in the forward gear or reverse gear that corresponds to the reverse or forward selected direction to which the gear selector 44 has been shifted; or (iii) if vehicle speed is lower than a reference speed, produce slip across the control elements of the transmission in the forward gear or reverse gear that corresponds to the selected position of the gear selector 44, operate motor 22 to produce output torque in a direction corresponding to the selected direction to which the gear selector 44 has been shifted and at a magnitude defined by a torque-speed function 90 until vehicle speed decreases to a reference speed, then fully engage transmission 16 in the forward gear or reverse gear that corresponds to the reverse or forward selected direction to which the gear selector 44 has been shifted.

In accordance with the provisions of the patent statutes, the preferred embodiment has been described. However, it should be noted that the alternate embodiments can be practiced otherwise than as specifically illustrated and described.

The invention claimed is:

1. A method for controlling a hybrid electric vehicle powertrain having an internal combustion engine driveably connected to a first set of wheels and an electric motor driveable connected to a second set of wheels, the method comprising the steps of:
   (a) operating the engine to power the vehicle;
   (b) shifting a gear selector between a forward drive position and a reverse drive position;
   (c) reducing vehicle speed to or lower than a reference speed; and
   (d) using a transmission located between the engine and the first wheels to produce reverse or forward drive corresponding to the position to which the gear selector is shifted.

2. The method of claim 1 wherein step (c) further comprises:
   using the motor to produce torque at the second wheels in opposition to the direction of rotation of the second wheels.

3. The method of claim 1 wherein step (c) further comprises:
   disengaging the transmission to release a drive connection between the engine and the first wheels.

4. The method of claim 1 wherein step (c) further comprises:
   slipping at least one control element of the transmission to partially disengage a drive connection between the engine and the first wheels through the transmission.

5. The method of claim 1 wherein step (c) further comprises:
   using the motor to produce a variable output torque defined by a function relating current vehicle speed and said output torque.

6. The method of claim 1 wherein step (c) further comprises:
   slipping at least one control element of the transmission to partially disengage a drive connection between the engine and the first wheels through the transmission; and
   using the motor to produce a variable output torque defined by a function relating current vehicle speed and said output torque.

7. The method of claim 1 wherein step (c) further comprises:
   disengaging the transmission to release a drive connection between the engine and the first wheels; and
   using the motor to produce a variable output torque defined by a function relating current vehicle speed and said output torque.

8. The method of claim 1 wherein step (c) further comprises producing no output torque from the motor.

9. The method of claim 1 wherein step (c) further comprises
   using an electric generator to produce torque on the engine in opposition to the direction of rotation of the engine.

10. A method for controlling a hybrid electric vehicle powertrain having an engine driveably connected to first vehicle wheels through an electric machine and a transmission, comprising the steps of:
    (a) operating an electric motor to drive second vehicle wheels;
    (b) shifting a gear selector between a forward drive position and a reverse drive position;
    (c) reducing vehicle speed to or lower than a reference speed; and
    (d) using the electric motor to produce reverse drive or forward drive corresponding to the position to which the gear selector is shifted.

11. The method of claim 10 wherein step (c) further comprises discontinuing operation of the motor until vehicle speed reaches the reference speed.

12. The method of claim 10 wherein step (c) further comprises:
    using the motor to produce a variable output torque defined by a function relating current vehicle speed and said output torque.

13. A method for controlling a hybrid electric vehicle powertrain having an engine driveably connected to first vehicle wheels and an electric motor driveably connected to a second vehicle wheels, comprising the steps of:
(a) operating an engine to power the vehicle;
(b) shifting a gear selector from a forward drive position to a reverse drive position;
(c) reducing vehicle speed to or lower than a reference speed; and
(d) using a transmission located between the engine and the first wheels to produce reverse drive.

14. The method of claim 13 wherein step (c) further comprises:
using the motor to produce torque at the second wheels in opposition to the direction of rotation of the second wheels.

15. The method of claim 13 wherein step (c) further comprises:
disengaging the transmission to release a drive connection between the engine and the first wheels.

16. The method of claim 13 wherein step (c) further comprises:
slipping at least one control element of the transmission to partially disengage a drive connection between the engine and the first wheels through the transmission.

17. The method of claim 13 wherein step (c) further comprises:
using the motor to produce a variable output torque defined by a function relating current vehicle speed and said output torque.

18. The method of claim 13 wherein step (c) further comprises:
slipping at least one control element of the transmission to partially disengage a drive connection between the engine and the first wheels through the transmission; and
using the motor to produce a variable output torque defined by a function relating current vehicle speed and said output torque.

19. The method of claim 13 wherein step (c) further comprises:
disengaging the transmission to release a drive connection between the engine and the first wheels; and
using the motor to produce a variable output torque defined by a function relating current vehicle speed and said output torque.

20. The method of claim 13 wherein step (c) further comprises using an electric generator to produce torque on the engine in opposition to the direction of rotation of the engine.

* * * * *